United States Patent [19]

Rampe et al.

[11] Patent Number: 4,827,700
[45] Date of Patent: May 9, 1989

[54] METHOD AND APPARATUS FOR WRAPPING ROUND BALES

[75] Inventors: Donald H. Rampe; Dennis J. Turnwald; Louis D. Fanger, all of Kalida, Ohio

[73] Assignee: Unverferth Manufacturing Co., Inc., Kalida, Ohio

[21] Appl. No.: 179,761

[22] Filed: Apr. 11, 1988

[51] Int. Cl.$^4$ ............................................. B65B 11/04
[52] U.S. Cl. ......................................... 53/587; 53/211
[58] Field of Search ................. 53/399, 441, 965, 211, 53/556, 587, 588, 118

[56] References Cited

U.S. PATENT DOCUMENTS

| | | | |
|---|---|---|---|
| 4,343,132 | 8/1982 | Lawless, Jr. | 53/399 |
| 4,409,776 | 10/1983 | Usui | 53/399 |
| 4,606,172 | 8/1986 | Miller | 53/399 |
| 4,662,151 | 5/1987 | Mathes | 53/211 X |

FOREIGN PATENT DOCUMENTS 2750101  8/1978  Fed. Rep. of Germany ........ 53/118

Primary Examiner—John Sipos
Attorney, Agent, or Firm—Marshall & Melhorn

[57] ABSTRACT

An apparatus for wrapping round hay bales includes an upstanding post having means for mounting to a three-point hitch attached to a lower end and a generally horizontally extending dispensing arm pivotally attached to an upper end. An elongated spindle is rotatably mounted on the post for engagement with a round hay bale along its longitudinal axis. A spinner plate is also rotatably mounted on the post and includes prongs for engaging an end of the hay bale. An hydraulic motor is provided for rotating the spinner plate which in turn rotates the hay bale on the spindle. An hydraulic cylinder and linkage is connected to the dispensing arm for rotating the arm and maintaining a sheet material dispenser assembly attached to the arm in a predetermined relation to the longitudinal axis of the bale to helically wrap sheet material on the exterior of the bale.

16 Claims, 3 Drawing Sheets

METHOD AND APPARATUS FOR WRAPPING ROUND BALES

BACKGROUND OF THE INVENTION

The present invention relates generally to a method and apparatus for wrapping round hay bales and, in particular, to a method and apparatus for helical wrapping round hay bales in a plastic film.

There are many prior art devices available for forming hay into round bales, moving the bales, and unrolling the bales when desired. The bales are rather large in size and can weight a few thousand pounds each. Since these bales are difficult to move and require a large amount of storage space, they typically are stored outside. Thus, the bales are exposed to the elements and tend to loose nutrients which would have been beneficial to the animals utilizing the hay for feed.

One method of preventing lose of nutrients is to wrap the bale in a plastic film. U.S. Pat. No. 4,594,836 discloses an apparatus and method for loading plastic tubing with bales. A removably mounted bracket delivers plastic tubing for the roll over one of opposite open ends of a vertically positioned, pivotally mounted drum. When the entire roll of plastic tubing is gathered over the drum outer surface and tied over one of the drum's opposite open ends, the drum is then pivoted to a horizontal operating position with the opposite open end facing a bale engaged by a carriage. The engaged bale activates a hydraulic cylinder to force a telescoping ram against the opposite face of the carriage. This causes the engaged bale to enter the drum and load into the plastic tubing. A drop gate extension on the carriage ejects the last bale from the drum to clear the apparatus. This apparatus has the disadvantage that the bales must be transported to it by a truck or other vehicle and the bales must then be stored in one long plastic tube.

SUMMARY OF THE INVENTION

The present invention concerns a method and apparatus for wrapping round hay bales in a plastic film. The apparatus can be mounted on a standard three-point hitch of a farm tractor thereby rendering the apparatus mobile. Furthermore, the apparatus only requires the tractor operator to complete the entire wrapping operation.

An elongated spindle extends through the center of a spinner plate for engaging and supporting a round bale of hay. The spinnnr plate includes three prongs radially displaced from the center of the plate for engaging an end of the hay bale whereby when the spinner plate is rotated, the bale rotates on the spindle. A source of hydraulic fluid is provided by the tractor to actuate a drive motor to rotate the spinner plate.

A vertically extending post is topped by a swing arm pivoted in a generally horizontal plane. A plastic film dispensing roll is attached to an outer end of the swing arm and a hydraulic cylinder is connected between the swing arm and the post for moving the swing arm in an approximately ninety degree arc.

The operator attaches a free end of the continuous sheet of plastic film to an outer end of the round bale and then actuates the drive motor to rotate the bale in a direction to roll the film on the outer cylindrical surface of the bale in a helical pattern as the hydraulic cylinder is actuated to move the swing arm thereby guiding the application of the film to the hay bale.

DESCRIPTION OF THE PREFERRED EMBODIMENT

Figure 1:
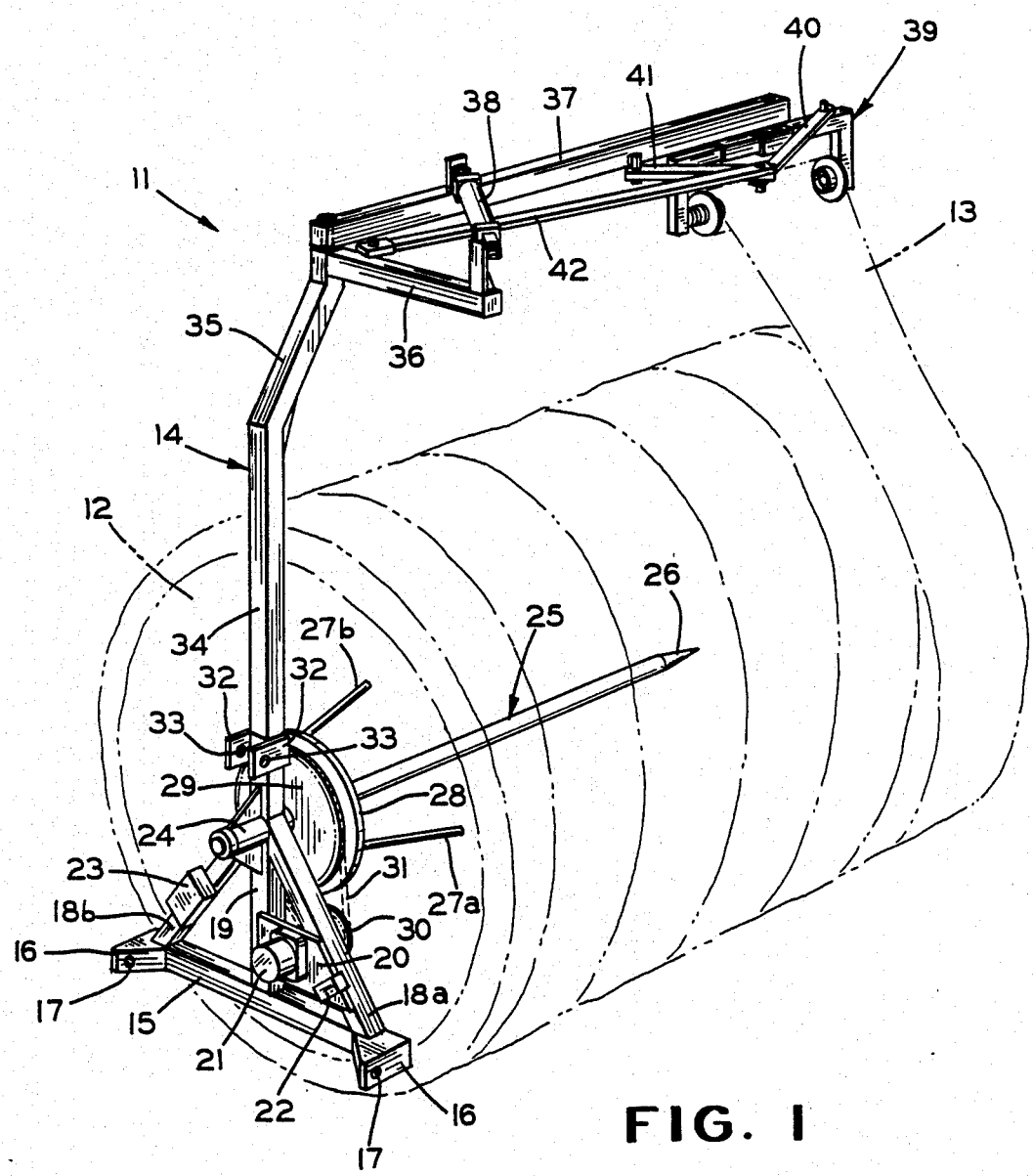
FIG. 1 is a perspective view of a round hay bale wrapping apparatus in accordance with the present invention.

A round hay bale wrapping apparatus 11, in accordance with the present invention, is shown in FIG. 1. A round bale of hay 12 and a continuous sheet of wrapping material such as plastic film 13 are shown in phantom so as not to obscure the details of the apparatus 11. The apparatus 11 includes a generally vertical upstanding post 14 having a lower end attached to a generally horizontally extending beam 15. A pair of generally triangularly shaped mounting brackets 16 are attached at either end of the beam 15. Each of the brackets 16 includes an aperture 17 for use in mounting or coupling the apparatus 11 to the lower two points on a standard three-point hitch at the rear of a tractor or similar vehicle. A pair of braces 18a and 18b are each attached at a lower end to the junction of the beam 15 and one of the mounting brackets 16. The braces 18a and 18b extend in an upwardly and inwardly direction and are attached to a lower portion 19 of the upstanding post 14.

A mounting plate 20 extends between and is attached to the lower portion 19 and the brace 18a. Attached to the mounting plate are a hydraulic drive motor 21 and a valve 22 which will be discussed below. Attached to the other brace 18b is a control box 23 for the hydraulic operating circuits. A bearing support 24 is attached to a front surface of the lower portion 19 of the post 14 at the point where the upper ends of the braces 18a and 18b attach. A spindle 25 has one end located in the bearing support 24 and extends through the lower portion 19 of the post 14 terminating in a pointed end 26.

A plurality of prongs 27a, 27b and 27c (shown in FIG. 2) are radially spaced from a center of a spinner plate 28. The spindle 25 extends through the center of the spinner plate 28 and the prongs 27a, 27b and 27c extend along and outwardly from the spindle 25. As will be discussed below, the spinner plate 28 is attached to a large sprocket 29. A small sprocket 30 is coupled to the hydraulic drive motor 21 for rotation thereby. A chain 31 extends around the small sprocket 30 and the large sprocket 29 such that when the hydraulic drive motor 21 is actuated, the spinner plate 28 and the prongs 27a, 27b and 27c are rotated. The upper end of the lower portion 19 of the upstanding post 14 has a pair of brackets 32 attached thereto adjacent the support 24. Each of the brackets 32 includes an aperture 33 for attaching to the third point on a standard three-point hitch.

A central portion 34 of the post 14 has a lower end which telescopes inside the open upper end of the lower portion 19. The central portion 34 continues upwardly and the post 14 terminates in an upper portion 35 extending upwardly and outwardly from the vertical. At the upper end of the upper portion 35 there is attached a generally horizontal beam 36 extending generally parallel to the longitudinal axis of the spindle 25. One end of a dispensing arm 37 is pivotally attached to the upper end of the upper portion 35. A hydraulically actuated cylinder 38 is connected between an outer end of the beam 36 and a point intermediate the ends of the dispensing arm 37. A plastic film dispenser assembly 39 is pivotally attached to an outer end of the dispensing arm 37 for retaining a roll of the plastic film 13. A shorter link arm 40 has one end pivotally attached to an end of the dispenser assembly 39. A second shorter link arm 41 has one end pivotally attached to the dispensing arm 37 between the hydraulic cylinder 38 and the dispenser assembly 39. A longer link arm 42 has one end pivotally attached to the horizontal beam 36. The opposite ends of the links 40, 41 and 42 are pivotally connected together such that these links form a guiding linkage to position the dispenser assembly 39 with respect to the round bale 12 as the hydraulic cylinder 38 rotates the dispensing arm 37 about its pivot point thereby helically wrapping the plastic film 13 about the round bale 12 as the bale is rotated.

Figure 2:
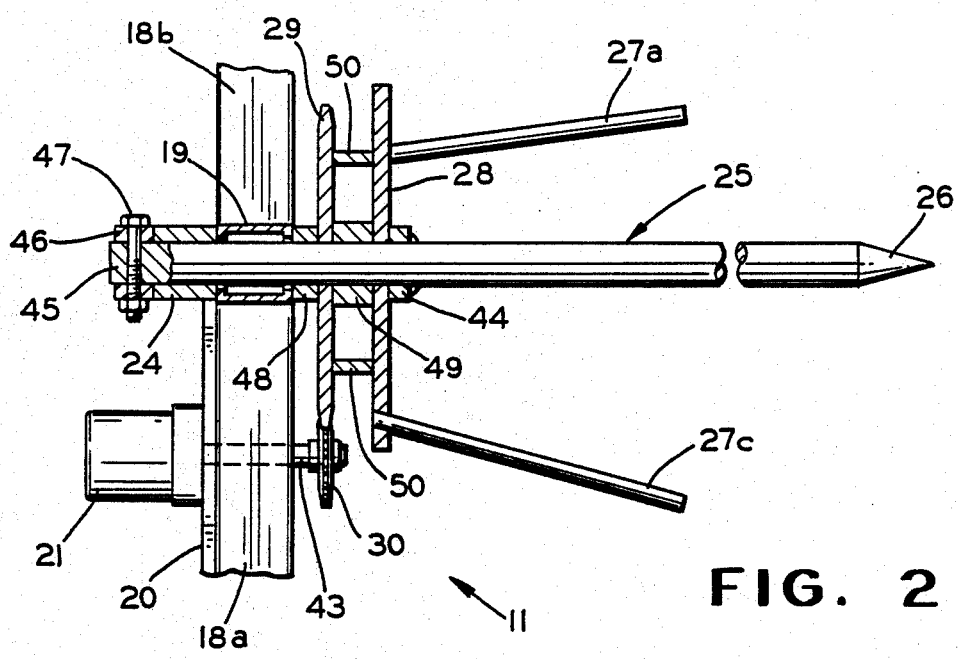
FIG. 2 is an enlarged fragmentary side elevational view in partial cross-section showing the spindle and spinner plate of the apparatus in FIG. 1.

Referring now to FIG. 2, the hydraulic motor 21 has an output shaft 43 which extends through the mounting plate 20. The small sprocket 30 is attached to an outer end of the shaft 43 for rotation therewith. Actuation of the motor 21 rotates the shaft 43 and the sprocket 30 thereby driving the large sprocket 29 through the chain 31.

The spindle 25 is rotatably mounted in the bearing support 24 and extends through the lower portion 19 of the post 14. A collar 44 is attached to the spindle 25 adjacent the spinnner plate 28 to prevent the spindle 25 from moving in a direction parallel to its longitudinal axis toward the bearing support 24. An end 45 of the spindle 25 opposite the pointed end 27 extends through the bearing support 24. A removable collar 46 is mounted on the end 45 by any suitable means such as a fastener 47. The collar 46 prevents movement of the spindle 25 in a direction parallel to its longitudinal axis toward the spinner plate 28. However, the collar 46 can be removed to allow the spindle 25 to be withdrawn from the apparatus 11 through the spinner plate 28.

The spindle 25 extends through a tubular spacer 48 which is positioned between the lower portion 19 of the post 14 and a facing surface of the large sprocket 29. The spinner plate 28 and the large sprocket 29 are spaced apart a predetermined distance by a second spacer 49 which can also be a sleeve bearing. The spinner plate 28 and the large sprocket 29 are connected together for co-rotation by a plurality of radially spaced brackets 50. Thus, the spinner plate 28 is driven in rotation about the spindle 25 by the hydraulic motor 21 and the spindle 25 floats in the support 24. When the spindle 25 is inserted into a bale of hay and the prongs 27a, 27b and 27c engage the bale of hay, the spindle 25 may be frictionally driven in rotation by the bale of hay as the spinner plate 28 rotates the bale of hay.

Figure 3:
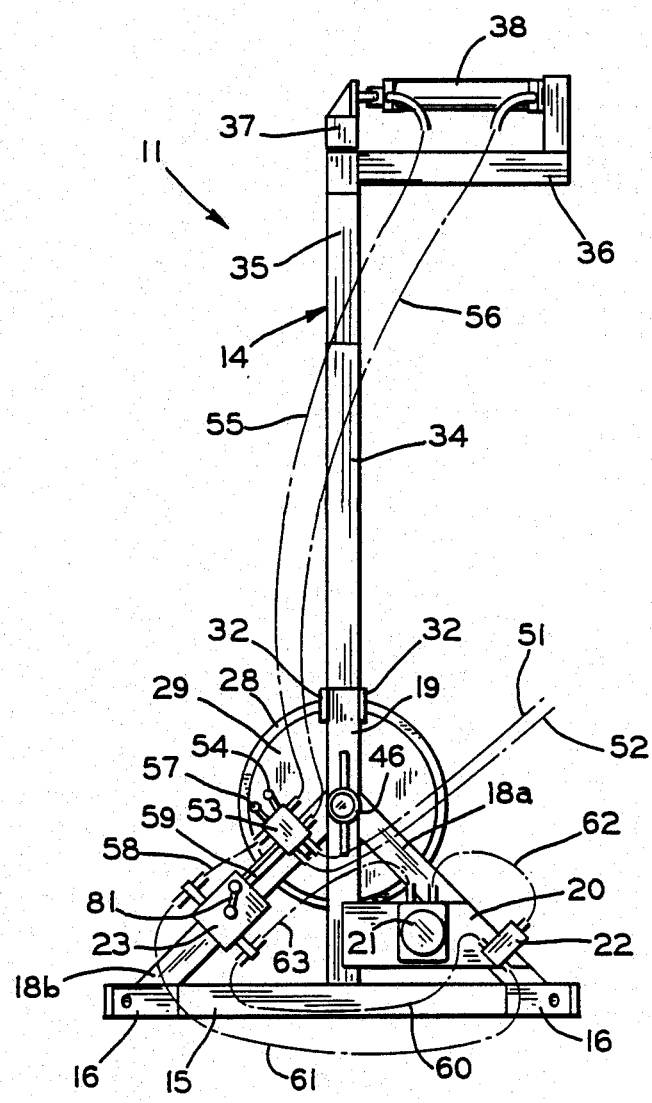
FIG. 3 is a front elevational view of the apparatus shown in FIG. 1.

There is shown in FIG. 3 the hydraulic actuating system for the apparatus 11. The central portion of each hydraulic line is shown in phantom so as not to obscure other elements of the apparatus 11. A hydraulic supply line 51 and a hydraulic return line 52 are connected to a source of hydraulic fluid under pressure (not shown) such as a tractor. The lines 51 and 52 are connected to a hand control valve 53 mounted on the brace 18b. The valve 53 has a first control lever 54 for controlling the application of hydraulic fluid through a pair of hydraulic lines 55 and 56 connected between the vale 53 and opposite ends of the hydraulic cylinder 38. The valve 53 also has a second control lever 57 for independently controlling the application of hydraulic fluid through a pair of hydraulic lines 58 and 59. The lines 58 and 59 are connected between the valve 53 and the control box 23 which is a flow control valve. The valve 23 is connected by a pair of hydraulic lines 60 and 61 to the valve 22 which is a counterbalance valve. The counterbalance valve 22 is also connected by a line 62 to the hydraulic drive motor 21. Finally, the drive motor 21 is connected by a hydraulic line 63 to the flow control valve 23.

Figure 4:
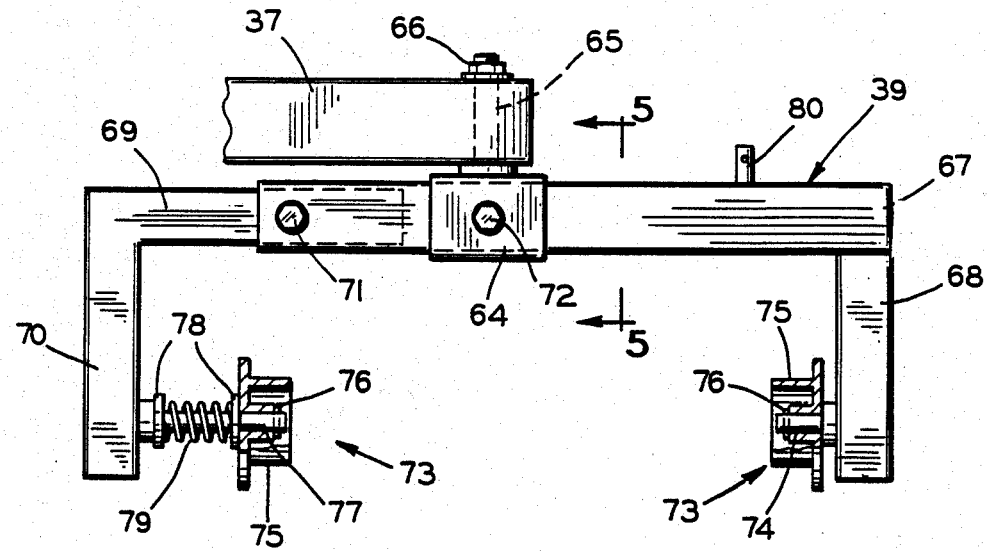
FIG. 4 is an enlarged front elevational view of the roll dispenser assembly shown in FIG. 1.
Figure 5:
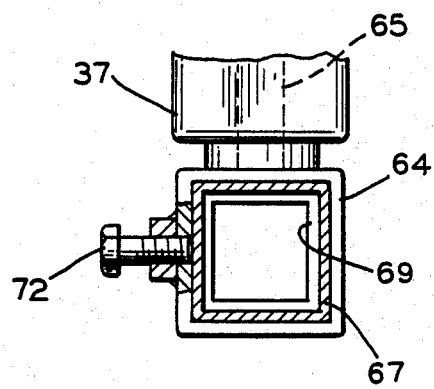
FIG. 5 is a cross-sectional view taken along the line 5-5 in FIG. 4 and enlarged.

There is shown in FIGS. 4 and 5 the plastic film dispenser assembly 39 in more detail. A mounting collar 64 is shown as having a tubular square cross-section. However, any suitable shape can be utilized. A threaded pin 65 is attached to an upper surface of the collar 64 and extends upwardly and through an end of the dispensing arm 37. The upper end of the threaded pin 65 threadably engages a nut 66 such that the collar 64 is pivotally attached to the arm 37. A generally L-shaped bracket has a generally horizontally extending leg 67 which extends through the center of the mounting collar 64. A generally downwardly extending leg 68 of the bracket is attached to an outer end of the leg 67. A second generally L-shaped bracket has a horizontal leg 69 which extends into an open end of the leg 67. A generally downwardly extending leg 70 of the second bracket is attached to an outer end of the leg 69. An adjusting screw 71 is threadably engaged in a side wall of the leg 67 for engagement with a side wall of the leg 69. Similarly, an adjusting screw 72 extends through a side wall of the mounting collar 64 into engagement with a side wall of the leg 67.

A roller support 73 is rotatably attached to an inner surface of a lower end of the leg 68 and the leg 70. A mounting shaft 74 is attached to the leg 68 and extends through a central opening in a cup shaped hub 75. A cotter pin 76 extends through an aperture formed in the end of the mounting shaft 74 to maintain the hub 75 on the shaft 74. An elongated mounting shaft 77 is attached to an inner surface of the lower end of the leg 70. Second cup shaped hub 75 is rotatably mounted on the shaft 77 and held on the shaft by a cotter pin 76. A pair of washers 78 are mounted on the shaft 77 between the hub 75 and the leg 70. A helical spring 79 is mounted between the washer 78 on the shaft 77 and biases the hub 75 against the cotter pin 76. A pin 80 extends from an upper surface of the leg 67 for pivotal connection with the shorter link 40.

The method of operation of the hay bale wrapping apparatus 11 will now be described. The mounting brackets 16 and 32, shown in FIG. 1, are attached to a three-point hitch mounted on the rear of a tractor or similar vehicle. The apparatus 11 can also be mounted on a front loader attachment. In either case however, the apparatus 11 is maintained in a position wherein the longitudinal axis of the spindle 25 is generally parallel to the ground. The apparatus 11 can be raised and lowered to locate the spindle at the center of any diameter bale of hay. The vehicle is backed toward the bale of hay such that the spindle enters the bale along the longitudinal axis of the bale and the prongs 27a, 27b and 27c enter the end of the bale closest to the tractor. The bale can be raised off of the ground for rotation during wrapping. After the bale has been wrapped, it can remain on the apparatus 11 for transportation to another location, for stacking, or for loading on any type of conveyance system.

The plastic film 13 typically is available in standard widths wrapped around a hollow spindle. The adjusting screw 71 in FIG. 4 is utilized to permit the arms 68 and 70 to be spaced apart the correct distance to accept the roll of plastic film. One end of the hollow spindle is inserted over the hub 75 attached to the leg 68. The hub 75 attached to the leg 70 is depressed against the spring 79 to permit the other end of the spindle to be aligned with the shaft 77 and then the hub 75 is released for engagement with the spindle. The spring 79 provides a frictional load against the roll of plastic film to insure a tight wrap.

Figure 6:
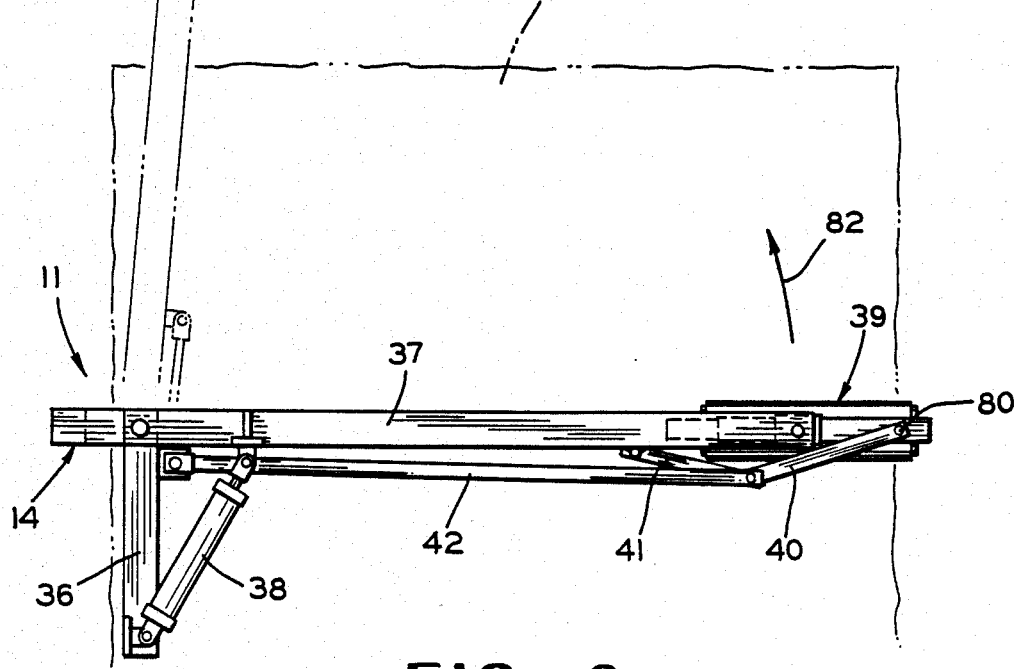
FIG. 6 is a top plan view of the apparatus shown in FIG. 1.

Referring to FIGS. 3 and 6, the hydraulic cylinder 38 is in the fully retracted position to align the dispensing arm 37 with the longitudinal axis of the round bale 12. The dispenser assembly 39 is also aligned with the longitudinal axis of the bale such that the plastic wrap can be applied tangentially to the cylindrical periphery of the bale 12. The outer end of the dispenser assembly 39 extends slightly beyond the outer end of the bale 12 so that the plastic film can be wrapped over the edge thereby permitting bales to be sealed when they are butted together.

Once the operator has inserted the spindle 25 into the bale 12, the operator leaves the tractor and attaches the free end of the plastic film to the end of the bale adjacent the dispenser assembly 39. The operator positions himself at the controls for the apparatus 11 and actuates the drive motor 21 by moving the control lever 57. Typically, the control lever 57 is moved to cause the bale 12 to be rotated in a counterclockwise direction as viewed from the perspective of FIG. 3. The second control lever 57 also permits the operator to reverse the direction of rotation of the bale for later unwrapping of the bale. The operator can actuate a control lever 81 on the flow control valve 23 to select the speed of rotation of the bale. The operator actuates the first control lever 54 to initiate rotational movement of the dispensing arm 37 in the direction of an arrow 82 as shown in FIG. 6. As the arm 37 rotates, the links 40, 41 and 42 maintain the dispenser assembly 39 parallel to the longitudinal axis of the bale 12 for uniform wrapping. The arm 37 is moved at a relatively slow rate of speed to permit easy control of plastic thickness. This is accomplished by placing a restrictor in the hydraulic circuit for the hydraulic cylinder 38. The wrap thickness is controlled through controlling speed of the rotation of the bale and/or stopping the actuation of the cylinder 38 at any desired points. The counterbalance valve 22 maintains a constant rotation speed even if the bale is not perfectly cylindrical or if the bale has been attached off center. The valve 22 also eliminates whipping of the bale due to these conditions. The length of the arm 37 is such that bales having a wide range of diameters can be accommodated.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for wrapping a round hay bale with a continuous sheet of wrapping material, comprising:
   an upstanding post;
   mounting bracket means attached at a lower end of said post and adapted to be coupled to a vehicle;
   a spindle rotatably mounted on said post and adapted to be inserted along a longitudinal axis of a round hay bale;
   spinner means rotatably mounted on said post and adapted to engage a round hay bale on said spindle for rotating the bale about its longitudinal axis;
   a dispensing arm pivotally attached to an upper end of said post and extending for rotation in a generally horizontal plane;
   a dispenser assembly attached to said arm and adapted to retain a source of a continuous sheet of wrapping material, said dispenser assembly moving along the axial length of the bale as said dispensing arm is rotated; and
   control means coupled to said spinner plate for rotating said spinner plate to wrap said sheet material around the bale.

2. The apparatus according to claim 1 wherein said mounting bracket includes means for coupling to a three-point hitch on the vehicle.

3. The apparatus according to claim 1 including control means for rotating said arm.

4. The apparatus according to claim 1 including control means for rotating said arm and said spinner means.

5. The apparatus according to claim 4 wherein said control means includes a hydraulic cylinder coupled between said post and said arm and adapted to be connected to a source of hydraulic fluid on the vehicle.

6. The apparatus according to claim 4 wherein said control means includes a hydraulic motor coupled to said spinner means for rotating said spinner means and adapted to be connected to a soure of hydraulic power on the vehicle.

7. The apparatus according to claim 1 including link means coupled to said post, said arm and said dispenser assembly for maintaining said dispenser assembly in a predetermined relationship with the longitudinal axis of the bale as said arm is rotated.

8. The apparatus according to claim 7 wherein said link means includes a first link arm having one end pivotally attached to an end of said dispenser assembly, a second link arm having one end pivotally attached to said dispensing arm, and a third link arm having one end pivotally attached to said post, said first, second and third link arms each having an opposite end pivotally connected together.

9. The apparatus according to claim 1 wherein said dispenser assembly includes means for selectively retaining sheet material in a range of widths.

10. The apparatus according to claim 9 wherein said dispenser assembly includes a pair of L-shaped brackets each having one leg telescopically engaged together and another leg for retaining one end of a wrapping material spindle.

11. The apparatus according to claim 1 wherein said dispenser assembly includes means for applying tension to the wrapping material as it is being wrapped around the bale.

12. An apparatus for wrapping a round bale of hay with a continuous sheet of wrapping material, comprising:
   an upstanding post;
   a three-point mounting bracket attached to a lower end of said post and adapted to be coupled to a three-point hitch on a vehicle having a source of hydraulic power;

a spinner plate rotatably mounted on said post and having a plurality of prongs for engaging an end of a round bale of hay;

a hydraulic motor attached to said post and coupled to drive said spinner plate in rotation;

a spindle rotatably mounted on said post and extending through said spinner plate, said spindle adapted to be inserted along a longitudinal axis of the bale;

a dispensing arm pivotally attached at one end to an upper end of said post;

a dispenser assembly pivotally attached at an opposite end of said dispensing arm and adapted to retain a roll of a continuous sheet of wrapping material, said dispenser assembly moving along the axial length of the bale as said dispensing arm is rotated;

a hydraulically actuated cylinder coupled between said post and said arm for rotating said arm about said one end;

linkage means coupled to said post, said arm, and said dispenser assembly for maintaining said dispenser assembly in a predetermined relationship to the bale during rotation of said arm; and hydraulic control means connected to said motor and to said cylinder and adapted to be connected to the source of hydraulic power for simultaneously controlling the rotation of said spinner plate and the rotation of said arm.

13. The apparatus according to claim 12 wherein said dispenser assembly includes a mounting collar pivotally attached to said opposite end of said dispensing arm, a pair of telescopically engaged L-shaped brackets extending through said mounting collar, means for releasably attaching said mounting collar to said L-shaped brackets, means for releasably attaching said L-shaped brackets together in any of a plurality of positions for retaining a range of widths of wrapping material, and means attached to said brackets for applying tension to the wrapping material as it is unrolled onto the bale.

14. The apparatus according to claim 12 wherein said control means includes a counterbalance valve connected between the source of hydraulic power and said hydraulic motor.

15. The apparatus according to claim 12 wherein said control means includes a flow control valve connected between the source of hydraulic power and said hydraulic motor.

16. The apparatus according to claim 12 including a hand control valve connected between the source of hydraulic power and said hydraulic motor and between the source of hydraulic power and said hydraulically actuated cylinder.

* * * * *